Oct. 26, 1954  E. O. LAWRENCE  2,692,532
CATHODE RAY FOCUSING APPARATUS
Filed April 4, 1951  5 Sheets-Sheet 1
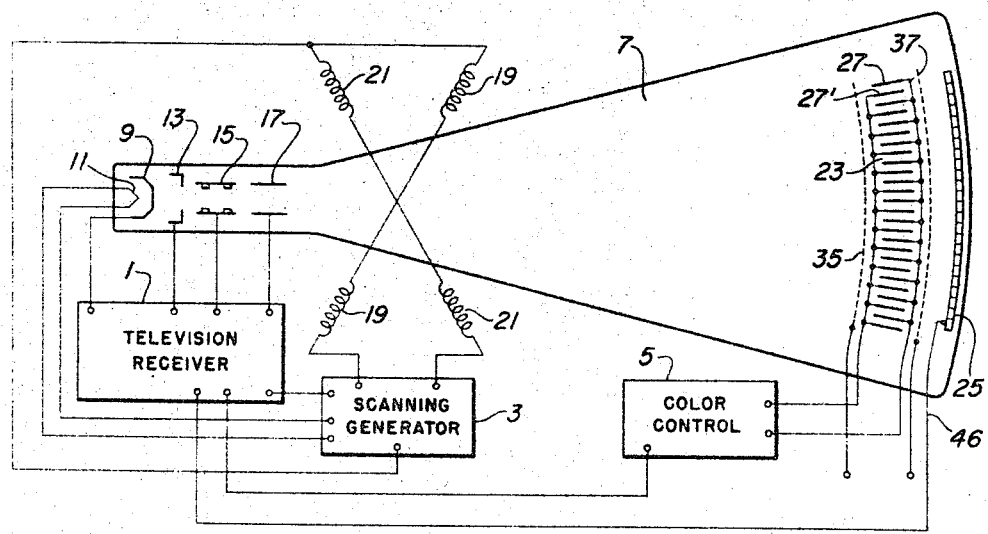
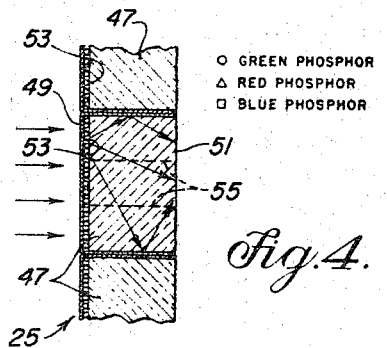
Fig. 1.
O GREEN PHOSPHOR
△ RED PHOSPHOR
□ BLUE PHOSPHOR
Fig. 4.
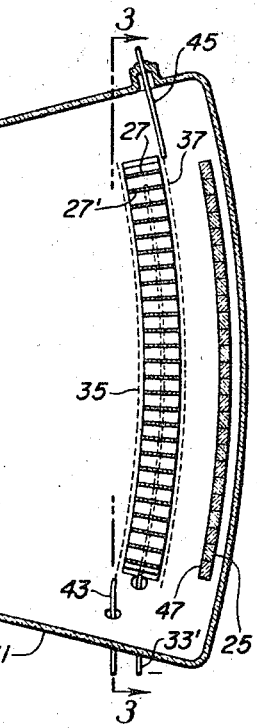
Fig. 2.
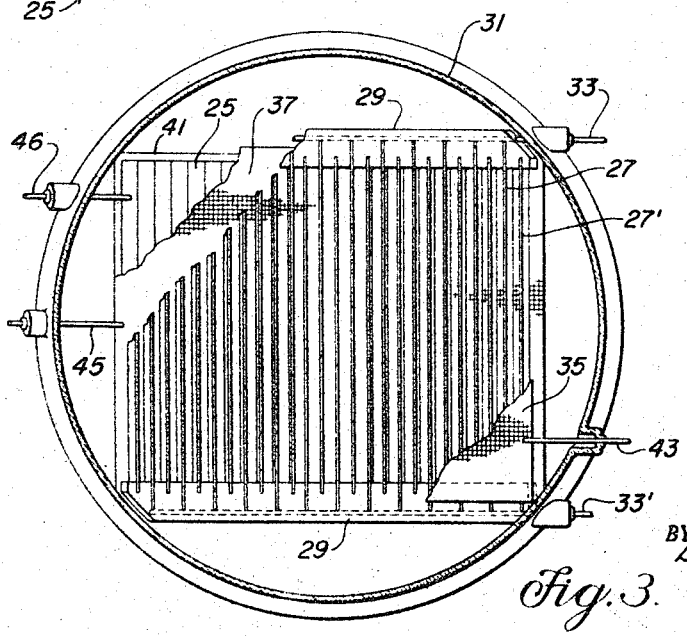
Fig. 3.
INVENTOR.
ERNEST O. LAWRENCE
BY Lippincott & Smith
ATTORNEYS.

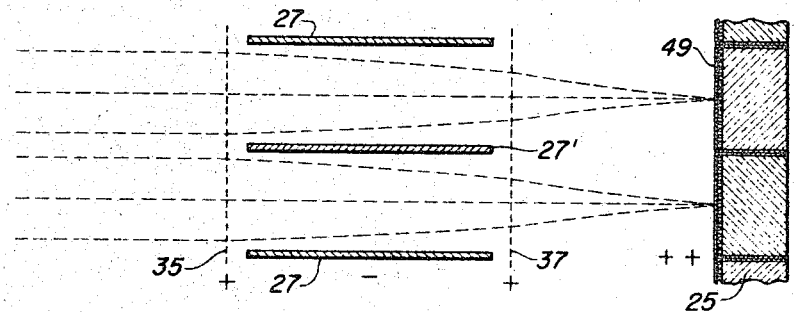
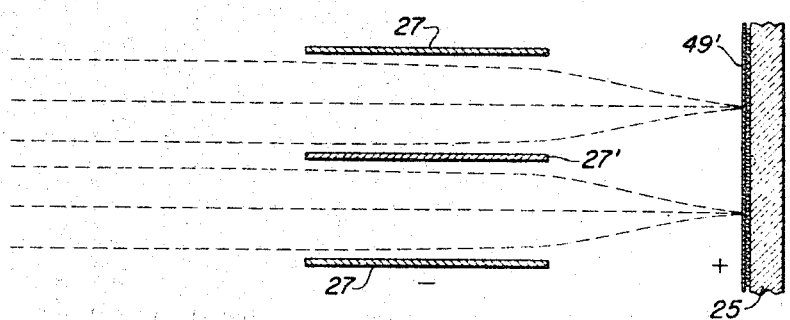
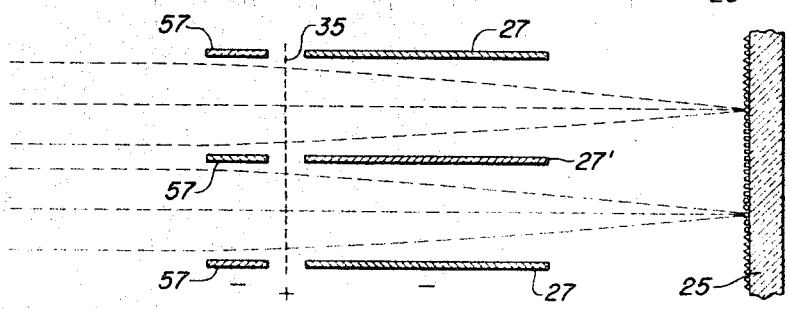
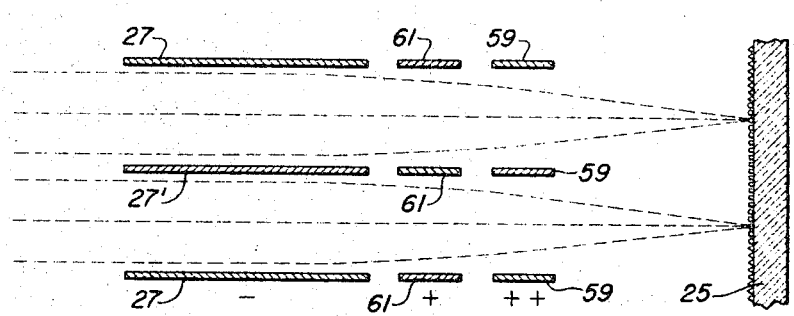
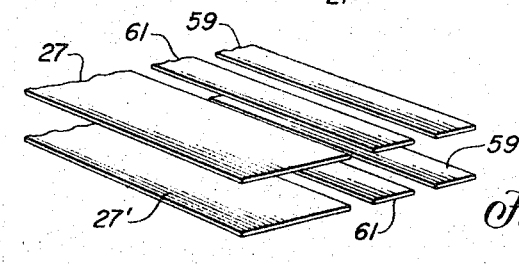

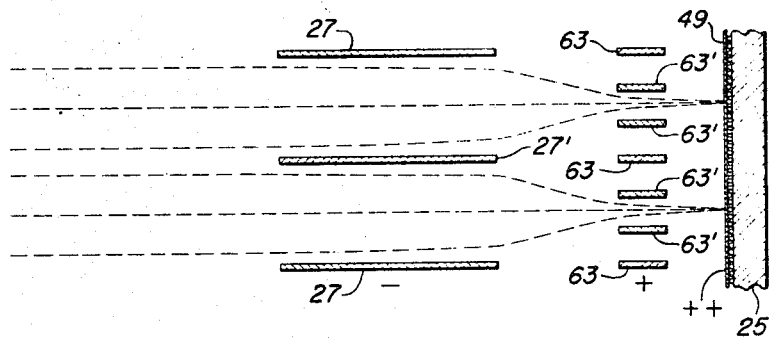
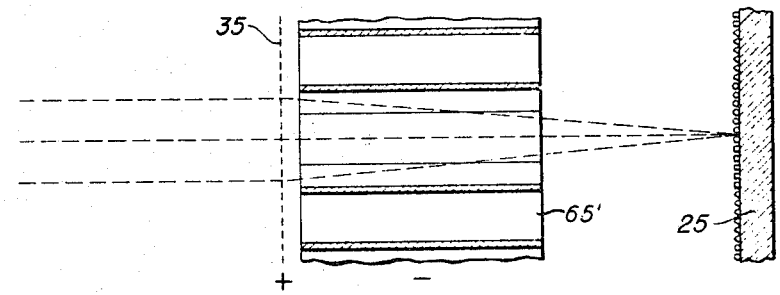
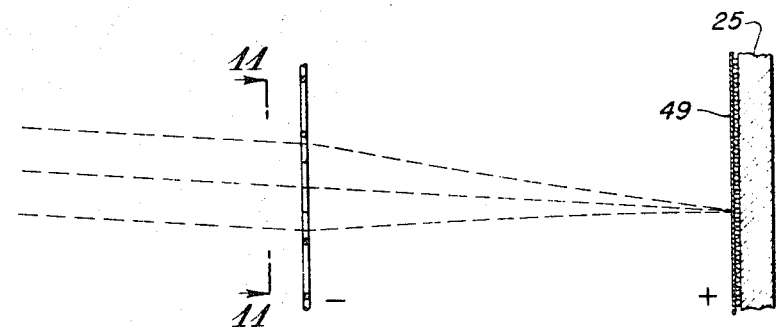
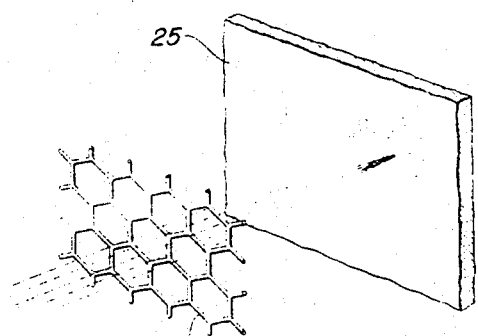
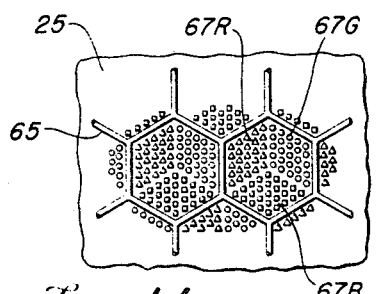

Oct. 26, 1954 E. O. LAWRENCE 2,692,532
CATHODE RAY FOCUSING APPARATUS
Filed April 4, 1951 5 Sheets-Sheet 4

INVENTOR.
ERNEST O. LAWRENCE
BY
Lippincott & Smith
ATTORNEYS.

Patented Oct. 26, 1954

2,692,532

UNITED STATES PATENT OFFICE 2,692,532

CATHODE RAY FOCUSING APPARATUS

Ernest O. Lawrence, Berkeley, Calif., assignor to Chromatic Television Laboratories, Inc., San Francisco, Calif., a corporation of California Application April 4, 1951, Serial No. 219,213

37 Claims. (Cl. 315—21)

This invention relates to cathode-ray display tubes, and while, in its broadest aspects, it is applicable to cathode-ray tubes of all types, including those employed as oscilloscopes, for radar, or for monochromatic television, it is particularly applicable to multi-color tubes for use in polychrome television and in its more detailed aspects the invention relates specifically to the latter.

Among the objects of the invention are to provide a cathode-ray tube structure wherein the cathode-ray beam can be brought to a finer focus than can be readily accomplished by conventional means; to provide a cathode-ray tube structure wherein the cathode-ray beam may be generated and deflected to cover a desired target area at a relatively low voltage and the electrons in the beam thereafter accelerated to strike the target itself at high velocity and give a brilliant image; to provide a direct-view, multi-color cathode-ray tube wherein the color displayed on the screen or target may be varied in any sequence desired, with a minimum expenditure of energy in the deflecting process through which the color variation is accomplished; to provide a direct-view, multi-color cathode-ray tube wherein the luminescence in the various colors appears, in the scanning of any individual elementary area of the picture field, to emanate from the same portion of the target or screen, irrespective of the color component of such area which may be momentarily excited; to provide a color tube of the type referred to wherein the time of transition between the different colors is a minimum, thereby providing the combination of a maximum duty cycle with a minimum of de-saturation of the color displayed; to provide a tube which may be employed with any of the presently known systems of color television transmission, whether the color sequence employed be at field, line, line-segment, or dot-sequential frequency; to provide a type of cathode-ray tube structure which is applicable to substantially any method of color switching; to provide a multi-color cathode-ray tube in which minimum sized areas of phosphors emitting various colors may be used while still retaining accurate control over the color emitted; and, in general, to provide a method of cathode-ray tube operation and excitation which may be employed in structures of a wide variety of types to yield any or all of the above-mentioned advantages.

In tubes of the character under consideration an electron gun is used which directs a beam of cathode rays against the target or screen area which, in display tubes, is a surface which luminesces under the impact of the electron beam. The intensity of luminescence is dependent on the intensity of the beam, i. e., of the beam current or of the number of electrons per second flowing in it, and of the velocity with which the electrons strike the target, the latter, in turn, being a function of the voltage with which they are accelerated. The electron gun normally embodies or is used in combination with some sort of electron lens system whereby the beam is focused to impinge upon the target in as small a spot as is possible. Some sort of a deflecting system is provided either electromagnetic or electrostatic, for deflecting the beam in its passage between the electron gun and the target or screen surface.

The higher the accelerating voltage applied, in order to provide the necessary brilliancy, the greater will be the power required to impart a given degree of deflection to the beam, this power varying as the square of the accelerating voltage employed. The properties of the electron lens system in the cathode-ray tube electron gun are very closely analogous to an optical lens system of converging type; usually the gun itself embodies a short-focus electrostatic lens of short focal length, which focuses an electron image of the emitting surface of the cathode (or of the grid aperture which the lens views as a virtual cathode), into a fine spot. This point is at one focus of an electromagnetic lens of relatively long focal length, the other focus of which is substantially in the plane of the target or viewing screen.

Since the electromagnetic lens is located at the neck of the tube, and relatively distant from the target or screen, the focal spot produced on the target area is magnified as compared to the image formed by the lens in the gun. The mutual repulsion of the electrons also has some de-focusing effect. There is therefore a limit to the fineness of spot that can be produced. Theoretically, the beam as it reaches the target is very slightly convergent. Owing to curvature of the field and aberrations in the lens system it may actually be convergent in some parts of the field and divergent in others, but for practical purposes no material error results if, for the purposes of this application, the electron paths in the vicinity of the target be considered as parallel.

In cathode-ray tubes of the direct-view multi-color type, a change in color is produced by causing the beam to impinge on target areas coated with phosphors emissive of the different primary colors employed, which are usually the three additive primaries of red, green and blue. In order to be able to synthesize, from these, white or any of the colors lying intermediate the three primary colors mentioned, i. e., the various shades of orange, yellow, blue-green and purple, and to make the light of these various colors appear to emanate from the same point on the screen, the elementary areas of different colored phosphors must be made very small and in order that pure colors may be obtained they must still be larger than the spot diameter.

In color television systems of the "dot sequential" type, wherein, in each scanning of the field, adjacent elementary areas appear in different primary colors, the beam must be effective only when it is impinging upon a phosphor area of a single color.

In making such tubes, some secondary means of deflection is used in order to direct the beam to that phosphor to produce the particular color light desired, although in some tubes a plurality of electron guns focusing the cathode-ray beams issuing therefrom on the target area from different directions, or by directing the cathode-ray beam, in the vicinity of the guns, to different paths a like result is secured. In systems of the dot sequential type, the use of secondary deflection necessitates that the cathode-ray beam be constantly deflected from one phosphor to another to change the resulting light from color to color. If the phosphor area to produce one color of light is of the same order of magnitude as the diameter of the beam, this implies that the beam must be turned off during the transition period and that its "duty cycle" be very small. The smaller the diameter of the beam, however, the shorter will be the time required to make the transition from an area emitting in one color to that emitting in another and if the beam can be made very small in comparison with the already small phosphor areas the duty cycle can be correspondingly increased, with a gain in brilliancy which is almost directly proportional to the increase in the duty cycle. Since one of the basic limitations of direct-view multi-color tubes is their low brilliancy, this is important.

In this same connection, it is desirable that as high an accelerating voltage as is feasible be used to excite luminescence and this in turn requires the use of relatively high voltages to produce the secondary deflection controlling the light colors displayed. In several of the types of color tubes which have been proposed the deflecting means used to produce such secondary deflections has a relatively high electrostatic capacity and to excite this capacity to such high voltages at line frequencies or higher may require a power output which is so great as to be practically prohibitive. This invention largely overcomes the limitations mentioned.

In accordance with the broadest aspect of the present invention, the electron beam is generated, focused and deflected over an area substantially the size of the target in the conventional manner. Adjacent to the target there is mounted an electrode structure, of substantially equal area, which constitutes a multiplicity of electron lenses of the converging type, which lenses, in one dimension at least, are of elementary size. Such an electron lens structure comprises at least two electrodes, one of which is provided with apertures which, in effect, constitute the pupil of the electron lens. The second electrode must be electron permeable, although it may take a variety of forms; it may be placed either ahead of, behind or within the first-mentioned electrode; it may have apertures alined with and corresponding in size to those in said first-mentioned electrode; it may be of metallic gauze, wherein the apertures are of much smaller dimension; it may be an extremely thin foil or layer which is too tenuous materially to retard the electron stream, or it may take still other forms. When a properly directed difference of potential is applied to two such electrodes, converging lenses are formed, the requirements being well understood in the art and the particular types of lenses mentioned being only a few of those which are known. Additional effects may be obtained by adding still further electrodes.

If the paths of the electrons in the beam are substantially parallel and the potentials applied between the lens electrodes are correct, the entire cross-section of the beam entering the aperture will be converged; to practically point size and dimension if the lens structure is the electronic equivalent of a spherical lens or to a narrow line if the optical analog be a cylindrical lens. The apertured electrode structure may be such as to have a material thickness in the direction of the electron travel so that the beam passes for some distance through a tube (in the case of a "spherical" lens) or a channel between substantially parallel plates in case the lens is of a "cylindrical" variety. Preferably, also, the lens is designed to function through the application of an accelerating potential through which the electrons pass after leaving the apertured electrode on their way to the target, achieving a large portion of their final velocity in this portion of their travel. Owing to the proximity of the electron lens system to the target, the deflected beam will have accomplished nearly all of its lateral travel before it enters the final accelerating field and the deflection can therefore be accomplished at lower power than would be the case in the absence of such "post-acceleration."

The above-mentioned features may be incorporated in cathode-ray tubes of all types. In the case of direct-view color tubes, further advantages accrue; in such tubes the target area is divided into elementary sub-areas which, when excited, display light in different observable component colors to the viewer. As utilized in the present invention, sub-areas of all of the colors utilized are disposed in line with the apertures and by virtue of the convergence produced by the lens all of the electrons entering the aperture can be focused on any selected one of these sub-areas. Where a secondary deflection of the beam is used to cause such selection, this may be accomplished prior to the beam entering the lens pupil, but in the preferred form of the invention as used in this latter type of tube the apertured structure is made in the form of a grid of mutually insulated elements between which such secondary deflecting potentials may be applied, and because of the relatively low velocity of the electrons at this point these deflecting potentials may be of a lower order of magnitude than those which would be required without the lens and still accomplish a complete shift of the focus as between the various sub-areas. Since the secondary deflecting potentials can be made so much smaller than the converging potentials of the lens, the aberrations produced are apparent only in the shift of the color displayed.

Thus, in one of the embodiments which will later be described in detail, the accelerating potential applied between the electron gun and the lens system is 5,000 volts, the post-accelerating potential is 7,000 volts but the secondary deflection, utilized to change the color displayed, is only 30 to 50 volts as compared to about 200 required to accomplish a similar shift in a tube of generally comparable construction but without the elementary electron lenses and post-acceleration. This alone accomplishes a saving in deflection power of over 80%. Other arrangements permit savings of 99% or more in color-deflection power.

All the above will be much more readily understandable by reference to the following detailed description of several embodiments of the invention, when considered in connection with the accompanying drawings wherein:

Fig. 1 is a diagram, partly in block form, of a color television receiver including a cathode-ray tube in accordance with the present invention, the electron lens and target area being shown schematically;

Fig. 2 is a plan-sectional view, on a somewhat larger scale, of the display end of the tube of Fig. 1 showing the target and electron lens system in somewhat greater detail;

Fig. 3 is a transverse sectional view of the tube illustrated in Figs. 1 and 2, (the plane of section being indicated by the line 3—3 in the second figure) illustrating the arrangement of the electrodes in the lens structure, parts of these electrodes being cut away in order to show each of the various layers of which the structure is composed;

Fig. 4 is a cross-sectional view, on a greatly enlarged scale, of a small portion of a preferred form of the target area, which may be employed in this invention to cause the apparent source of luminosity of all of the colors employed to be the same;

Figure 17:
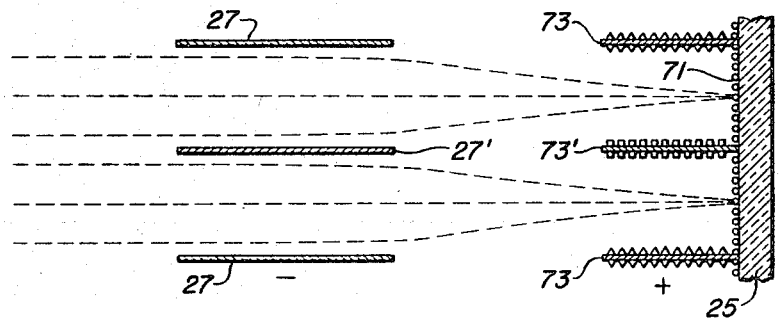
Figure 18:
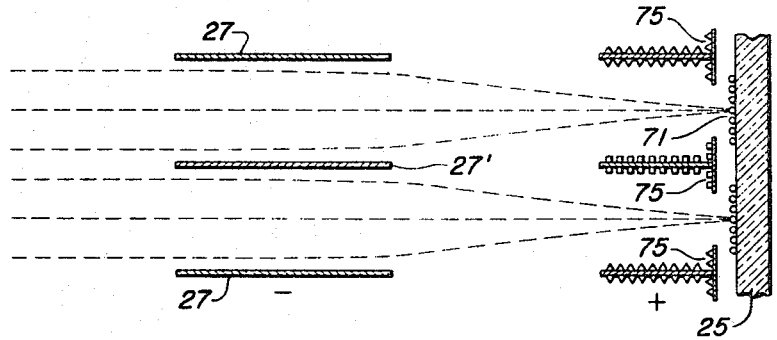
Figure 19:
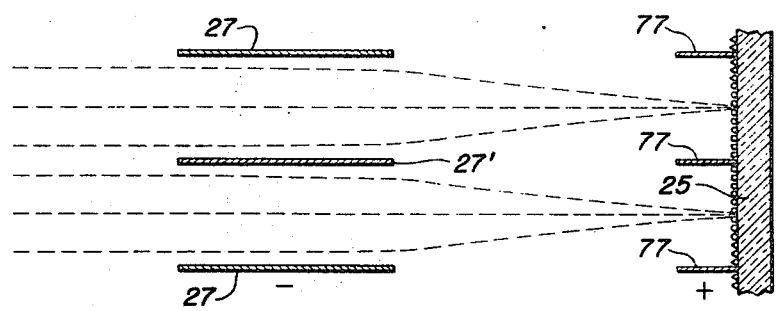
Figure 15:
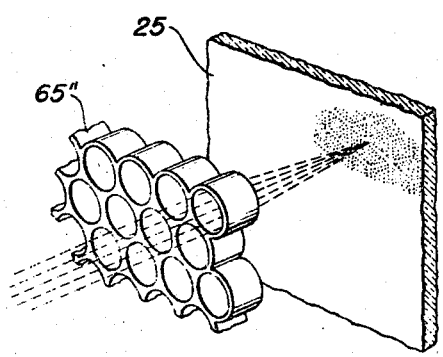
Figure 16:
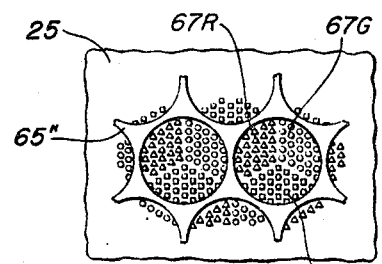
Figure 20:
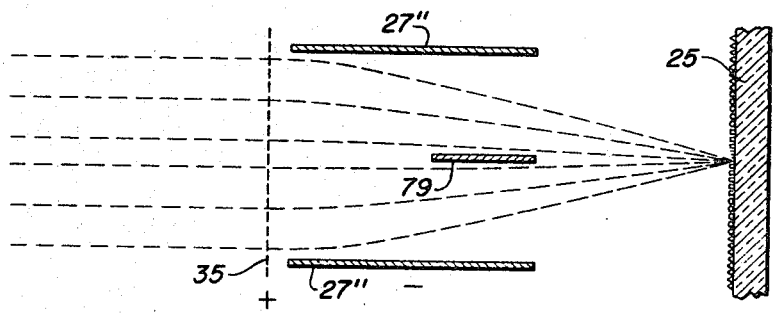
Figure 21:
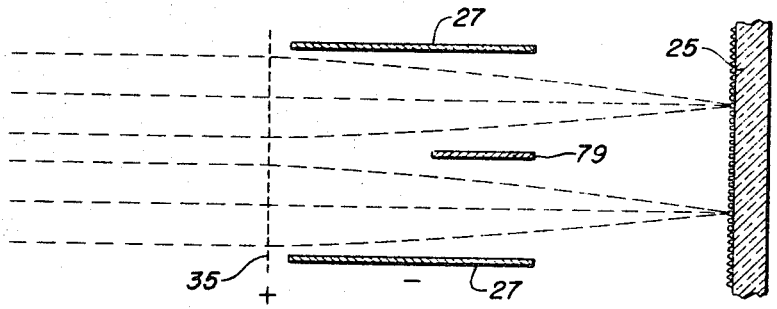
Figure 22:
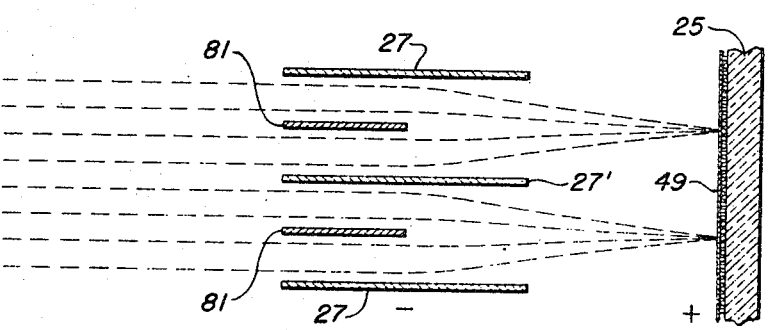

Figs. 5 to 8 inclusive are diagrammatic sections of portions of electron lens systems of various types;

Fig. 9 is an isometric view of a fragment of the lens system illustrated diagrammatically in Fig. 8;

Fig. 10 is a diagrammatic representation similar to the diagrams shown in Figs. 5 through 8, showing still another possible lens structure;

Fig. 11 is an elevation, Fig. 12 an isometric view, and Fig. 13 a diagrammatic section of a lens system for converging the incident beam in two dimensions, to provide a structure adapted for use of tubes in the type where the color selection is accomplished by the direction of the beam prior to its entering the lens system, the individual lenses in this case being formed as a hexagonal or "honeycomb" structure;

Fig. 14 is a diagrammatic section of another type of lens for the same purpose as the three preceding figures;

Figs. 15 and 16 are, respectively, an isometric view and a plan view of a system similar in purpose to that of the four preceding figures but utilizing cylindrical instead of hexagonal apertures;

Figs. 17, 18 and 19 are diagrammatic views of lens and target structures showing different dispositions of the phosphors but the same general class of lens; and Figs. 20 through 22 are diagrammatic illustrations of lens structures wherein a somewhat different type of color deflection is employed.

In Fig. 1 there is shown a television receiver 1 which is connected and supplies control signals to a scanning generator 3 and a color control generator 5. Each of these components is shown in block form; the scanning generator and color control would, in practice, normally be included in the same chassis as the receiver proper but they are shown separately for convenience of reference.

Each of the devices mentioned supplies operating potentials of various types to the cathode-ray tube 7 with which the present application is primarily concerned. The tube comprises the usual electron gun, indicated in the figure as including the usual indirectly heated cathode 9 excited by a separate heater 11, a control grid 13 and first and second anodes 15 and 17 respectively. The picture or video modulation signals are applied between the cathode 9 and control electrode or grid 13, regulating the density of the beam in accordance with the relative potential supplied, in the well known manner. The two anodes together comprise an electron lens of the converging type, which forms a reduced image of the cathode (or of a virtual cathode which may be considered as formed at the aperture of the grid) in the neighborhood of the gun. This image is refocused magnetically on or near the luminescent screen which comprises the target area of the tube.

It is now well known that "electron optics" operates upon principles which run quite closely parallel to conventional optics. It is therefore convenient to use the usual optical terms in describing the comparable electron systems, and this practice will be followed throughout this specification with, of course, due mention of differences where this is necessary.

The optical analogy holds good as far as magnification is concerned, and the electron image formed in the neighborhood of the target is, in the absence of further lens systems, related in size to the size of the first image as the distance from the center of the electron lens to the target is to the distance from that center to the cathode; i. e., the principle of similar triangles holds. In a fairly large tube the distance from the electron gun lens to the target may be in the neighborhood of 20 centimeters, while the distance from the virtual cathode to the center of the lens may be 2 or 3 centimeters. The diameter of the spot formed by the beam on the target in a conventional tube of this type will be of the order of a half millimeter. The paths of the electrons in the neighborhood of the target may therefore be considered as being parallel without introducing any error which is important as far as the present invention is concerned.

As in conventional television apparatus, the cathode-ray beam is deflected in one dimension by horizontal scanning coils 19 and in the other dimension by vertical scanning coils 21. The currents in these coils are supplied by the scanning generator 3 under the control of synchronizing signals fed to it by the television receiver.

Thus far, the description corresponds to that of any conventional television receiver except for the color control 5 which was mentioned in passing. This invention relates specifically to the lens structure generally designated by reference character 23 and to the target area 25, here shown as a separate structure mounted on a supporting frame 8, within the tube, although targets mounted on the face of the tube may be used, as will later become apparent. The particular lens structure shown in the first three figures has been chosen for this purpose for a number of reasons; first, because it is applicable to color tubes which may be used to replace conventional tubes already in operation, without modification of the deflecting systems which may be already embodied in the receivers employed, and second, because it lends itself to a discussion of the general principles employed which might not be evident in a simpler and at times preferred lens system.

The lens system shown comprises a multiplicity of "cylindrical" or line focus lenses, which serve to converge the electron beam in one dimension only, leaving it unaffected in the second dimension and thus bringing the electron beam to a line (as distinguished from a point) focus. As shown diagrammatically in Fig. 1 and more fully in Figs. 2 and 3, the lens system comprises an apertured electrode structure formed of strips 27 and 27', preferably of sheet metal, mounted parallel to each other in the dimension extending across the target area and in planes substantially parallel to the paths of electrons from the gun to the target proper. In one tube which has been constructed, these strips are approximately ⅓ millimeter wide; their number should be in the neighborhood of 500 if the tube is to be used to display images transmitted under present standards. Fewer strips are shown and their proportions are distorted for purposes of illustration.

As is best shown in Fig. 3, adjacent strips are mutually insulated from each other, being set in bars 29 of an insulating character, such as glass or ceramic material. Alternate of the strips comprising this grid-like structure are connected together through leads entering through the wall of the tube envelope 31, the strips 27 being connected to lead 33 while the strips 27' connect to lead 33'. The parts are arranged so that the structure as a whole is at a substantially uniform distance from the target area 25. In use the device is preferably mounted so that the long dimension of the strips is substantially vertical and thus generally at right angles to the direction of the more rapid or line scanning.

Mounted adjacent to the lens-grid thus formed and also at a uniform distance therefrom is a secondary electrode system comprising one or more electron-permeable electrodes of like area to the lens-grid structure. Depending upon the focusing potentials employed, the additional electron-permeable electrode may be either in front of or behind the apertured electrode structure; in the present instance two such electron-permeable electrodes are shown, electrode 35 being ahead, or on the electron gun side, of the lens-grid while electrode 37 is behind or on the screen side of the lens grid. In this case these electrodes are designed to present as nearly as possible an equi-potential plane as viewed from the lens grid. They are illustrated as made of a fine gauze mesh stretched across a frame 41. They could also be of very thin aluminum foil, similarly mounted, although this would present structural difficulties.

A connecting lead 43 extends through the wall of the tube from electrode 35 and a similar lead 45 from electrode 37. To operate this structure in the manner contemplated by the invention the potential applied to electrode 35 is of approximately the value that would be used on the final anode of a conventional tube. The average potential applied to the lens-grid structure is considerably negative to that on electrode 35, perhaps 700 volts. Electrode 37 is again positive, being equal to or higher in potential than electrode 35.

Considering the electrode 35 as a unipotential surface, the lines of force constituting the field between it and the apertured structure 27, 27', terminate in this surface in a uniform distribution. The other ends of these lines of force terminate at or near the opposed edges of the strips 27, 27'. The electrons in the beam passing through electrode 35 are decelerated by the longitudinal component of the field defined by these lines of force and directed inwardly toward the center of the apertures between the strips by the lateral component. An electron passing down the exact center of the space between the adjacent strips will cross or cut none of these lines and therefore hold its original path. An electron grazing either side of the space will cut substantially all of the lines of force terminating on that side of the strip 27 or 27' and therefore will be subjected to an inwardly directed component of the electric field. Intermediate electrons will cut fewer lines and therefore be subjected to a smaller lateral component. All of the electrons in the beam are therefore subjected to lateral forces which are, quite closely, proportional to their distance from the axis of the individual lens, with a resultant convergence of the beam toward a single line.

Electrode 37 is, as has been stated, supplied with a higher potential. The electric field between electrode 37 and the apertured electrode is similar in shape to that just described, but reversed in direction both spatially and electrically so that it also has a converging effect upon the electrons passing through it, the entire lens system being comparable to an optical doublet. By adjusting the relative potentials of the parts, the focal plane of the doublet can be made the plane of the inner surface of the target area 25. The accuracy of focus is sufficient so that the entire number of electrons entering between any of the two plates can be concentrated in a line whose width is less than one tenth of the width of the aperture.

It has been explained that the strips 27 and 27' are mutually insulated and that alternate strips of the grid are connected together, i. e., all of the strips 27 are connected and, similarly, all of the strips 27'. If, now, a difference of potential is applied between these two sets of elements, the field between any adjacent pair will be substantially uniform and all of the electrons in the beam passing through the interspace between the strips will be given equal accelerations away from the strip which is negative and toward the positive strip. The result is a shifting of the focus toward whichever of the strips happens to be positive at the moment. In adjacent elementary lenses, therefore, the deflection occurs in opposite directions.

Phosphors are deposited upon the target area in such fashion that deflections thus produced will deflect the focal point in such manner as to change the colors displayed upon the screen. In order to accomplish this the target area is subdivided into linear sub-areas which display different colors. The number and specification of the colors used depends upon the particular system in which the tube is to be employed. It is contemplated that a three-color system will be standardized upon in the United States, but two-color systems have been proposed and others are possible. Assuming that a three-color system is to be used, the portion of the target area in alinement with the aperture of each individual lens is divided into three sub-areas so arranged that, considered in the direction of scan across the target, the colors alined with each aperture are the same but appear in opposite order with respect to successive lenses; thus, considered between the first strip 27 and the first strip 27' the order might be red, green, blue, in which case the order as between the first strip 27' and the second strip 27 would be blue, green, red. Another way of saying this is that the colors would appear in the same order, counting outward from the junction between any pair of elementary lenses.

In the particular target or screen illustrated in Fig. 2, a portion of which is shown on a larger scale in Fig. 4, the target area is composed of vitreous rods 47 of substantially rectangular cross-section. The width of each rod is substantially equal to the spacing between adjacent strips forming the lens grid. The three-colored phosphors are deposited in longitudinal strips on each of the glass rods 47. As in the case of an earlier filed patent application of this applicant identified as application Serial No. 150,732, filed March 20, 1950, the different phosphors are represented by small blocks of different shapes, the green phosphors being represented by circles, the red phosphors by triangles and the blue phosphors by squares. This is shown in Fig. 4. It will be recognized, of course, that actually the phosphors are ground to almost impalpable powder form and that the size of the symbols has no relation to the actual size of the phosphor grains. Over the phosphor layer, and also on each of the adjacent sides of the rectangular rods, is deposited a very thin layer 49 of light-reflecting material, usually aluminum evaporated upon the surfaces mentioned. As a result of this arrangement the only escape for light generated by any of the phosphors is through the uncoated side f the particular rod upon which it is deposited. Some of this light will escape directly, some will be subject to one or more reflections before it escapes as indicated by the arrows in Fig. 4. The uncoated or viewing surface 51 of each of the rods is preferably ground or otherwise treated to make it light-diffusing. When thus arranged the entire width of the rod will glow, practically uniformly, with light of the particular color which is momentarily excited and there will be no apparent shift of the position of the excited spot with change of scanning beam impact to produce a different light color.

It should be noted that it is not essential that the three phosphors used to display the three different component colors be different, since a white phosphor, emissive of all three components, can be used if filters be interposed between the phosphor and the glass rod. Such filters may be "flash coatings" on the surface of the glass, such as the gold coating of the well known ruby glass for the red, cobalt for the blue, any any of several other metallic coatings for the green. This is somewhat wasteful of light but presents advantages in the coating process. A compromise arrangement is also possible; the pure red phosphors known at present are not as satisfactory as those available in either blue or green. It is more practical, at present, to use a beryllium-base phosphor which is emissive of an orange light, in combination with a red filter which takes out the green component of this color. It is therefore possible to deposit the red light producing phosphor on a portion only of the surface 53 of the rod, which portion has a ruby coating, leaving the remainder of the surface of the rod clear. It will also be realized that each rod may be composite, being built up of smaller rods fused or otherwise joined together as indicated along the dotted lines 55. If this method of construction is used, the filtering coatings may be deposited on the rods prior to joining them into a unitary structure.

With the sub-areas of the target coated and alined as has been described, it will be seen that when the plates 27 and 27' are at the same potential the beam will be focused in a narrow line on the green phosphor. If the strips 27 are made negative with respect to the strips 27', the beam will be deflected in the direction of the latter, exciting the blue phosphor, while if the strips 27 are relatively positive, the red phosphor will emit. It will be noted that as between adjacent rods 47 the red phosphors are shown to be contiguous and the blue most widely separated as between the upper and middle rods shown in Fig. 4, whereas between the middle and lower rods it is the blue phosphors which are contiguous and the red (not shown on the lower one) most widely separated. In other words, as has been already stated, the phosphors appear in the same order counting outward from each junction or in opposite order when considered in the direction of scan. The junction between the upper and middle rods of this figure is assumed to be alined with a strip 27.

The lateral dimension of the focus is relatively small in comparison to the width of the various phosphor strips. If the focal point is being deflected from, say, the red phosphor toward the green, the transition time when the two phosphors are excited simultaneously is therefore very short, being inversely proportional to both the speed with which it is being deflected and the width of the beam. If the deflection be continuous and at a constant rate, the duty cycle, during which a pure color is emitted, can be made proportional to the factor by which the width of the phosphor strip exceeds the width of the focal line, and the luminous efficiency of the tube is therefore relatively high.

The potentials applied between the plates 27 and 27' are supplied by the color control 5, and will vary in magnitude in accordance with anode and focusing potentials employed and in waveform and frequency in accordance with the particular system of color vision transmission being used. With the anode and focusing potentials that have been mentioned a complete color change can be effected with a secondary deflecting voltage of 13 volts. In practice, to obtain a favorable duty-cycle, the potentials supplied range from 30 to 50 volts. In the case of a field sequential the color control voltage used would preferably be of substantially rectangular waveform and at a frequency one-third the field frequency, the waveform having a "plus" potential for the first third of the cycle, zero for the next third and "minus" for the last third of the cycle. With a line sequential system the waveform might be substantially the same but at one-third line instead of one-third field frequency. A dot sequential or segment system could still use the same waveform at a correspondingly higher frequency or, as shown in the prior joint application of Lawrence, Aiken and Mack, Serial No. 150,731, it could be a sine wave which would display green twice per cycle for a shorter period and red and blue once per cycle for a longer period. The structure of the device itself need not differ as between these three systems.

Figs. 5 through 8 are diagrammatic representations of a number of different types of lens structure, the dashed lines indicating generally the paths taken by electrons entering the elementary lens pupils adjacent the edges thereof and axially thereof respectively. In each case the diagram represents a cross-section through two of the elementary lenses. Fig. 5 illustrates the lens structure which has just been described in detail, and is shown for comparison. It should be apparent that the first lens of the doublet, comprising the field existing between electrode 35 and electrodes 27 and 27', exercises the greater part of the focusing effect. This is because the transverse velocities effective upon the outer electrons of the beam imparted by the fields constituting this portion of the lens are effective from the instant the electrons pass through them up to the time that the electrons hit the target. During half this distance, while the electrons are within the shielded area between the strips 27, 27', they are travelling at a constant and minimum velocity in the axial direction. Upon passing through the second lens element, they are again accelerated, and although they are given an additional transverse velocity this additional velocity is effective over only about one-half of the distance that the first velocity has to act and for less than one-half the time. Finally, they pass through the focusing field nearer the axis and hence cut fewer lines of force. The paths of the electrons while in the substantially uniform field region between the strips are nearly linear. If the coating 49 is at the same potential as electrode 37, the electron paths will be straight in passing between these two positions. It is possible, however, to place a very much higher potential on the coating 49 than on the electrode 37, in which case the electron paths become parabolic, the curvature being convex toward the lens axes and decreasing as the coating 49 is approached.

Where a tube of great brilliancy is desired, this can become a very important factor. The potential between the elements 37 and 49 can be made very high in comparison with the potentials effective up to this point, with a corresponding increase in the brilliancy of illumination of the tube, and this increase in brilliancy can be obtained without corresponding increase in the power expended in either the primary or the secondary deflection.

Thus, for example, electrode 35 may be operated at a potential of 5,000 volts above the cathode as before, electrode 37 may be operated at the same potential, but an additional high voltage (say 50,000) may be imposed between layer 49 and electrode 37. If this be done, the space between these two latter surfaces will have to be increased or the relatively negative potential applied to the apertured electrode will have to be greater in order to focus the beam upon the screen. By this latter expedient the greater part of the convergence of the beam may be made to take place between the plates (say, roughly, two-thirds of the total convergence) the remainder occurring after the electrons have passed the electrode 37. The secondary deflection relied upon to effect the color change will have to be increased slightly but it can still be only somewhere in the neighborhood of 50 volts. In order to produce the same deflection with a beam travelling at a 50 kilovolt instead of something less than a 5 kilovolt velocity, the deflecting voltage would have to be raised proportionally and the power required to effect the deflection would vary as the square of the voltage. Consequently, with the arrangement suggested, only approximately 1% of the power is required to effect the color change, where "post-acceleration" (acceleration after deflection), is used, as would be the case without employing this expedient. If a final anode voltage of the order of 5,000 is employed, the primary and secondary deflections can be accomplished at voltages of the order of 500, with like savings in power.

Fig. 6 is a similar diagram of a still simpler lens structure and one which has many advantages for use in tubes of moderate power and brilliancy. In this case the apertured electrode or lens-grid structure comprising electrodes 27 and 27' is the same as before. The second element constituting the lens is the thin electron-permeable layer 49' deposited directly in contact with the phosphor coatings. All of the secondary deflection velocities are imparted to the electrons in the beam before they enter the fields constituting the lens proper. It can be shown that if, in a lens structure of this type, the potential between the coating 49' and the elements 27, 27' is three times the potential difference between the cathode and the apertured electrode, the best focus is secured. It is an interesting fact that this is substantially independent of the spacing of the electrodes. The lateral velocity imparted to the electrons is proportional to the number of lines of force they cross or cut. If the spacing between the apertured electrode structure and the screen is increased, the number of lines cut is decreased in inverse proportion but the time through which the lateral velocities have to act is increased in direct proportion and the beam remains in focus. Similarly, if the spacing between the strips 27, 27' be increased while their distance from the electrode 49' remains constant, the number of lines terminating on each strip increases, more lines are cut by the marginal electrons in the beam and again the proper focus is secured. It follows that exact spacing of the elements is not necessary and some slight departure from equidistance between the electrodes can be tolerated. This leads to relative ease of manufacture and makes this form of lens structure especially important.

The lens structure shown in Fig. 7 may be considered as the inverse of that of Fig. 5 in that instead of using two gauze electrodes and one strip electrode structure it uses a single gauze electrode 35, the apertured structure 27, 27', and a second similar structure formed of strips 57 mounted in the same planes as the strips 27 and 27'. The electrical lens formed by this arrangement is also a doublet. It has the advantage that the lateral velocities used to accomplish the focusing are all applied within a very short space, which reduces the aberrations to some extent but since these aberrations are unimportant in any event this particular system would not usually be the choice as it is slightly more complex than some of the others shown. In this case the potentials applied to the elements 57 and 27, 27' would usually be approximately the same, with electrode 35 at a higher potential. Since the secondary deflection to accomplish the color change must be applied to the strips 27, 27', between which the electrons are travelling at their final velocity, this structure is not as economical of power as those systems in which post-acceleration is employed.

The structure shown in diagram in Fig. 8 and in isometric projection in Fig. 9 is principally for the purpose of indicating that the "electron-permeable" electrode may take the form of one which is apertured in the manner similar to the apertured electrode stucture employed in all of the lenses already described instead of taking the form of a gauze or other type of electrode giving a substantially unipotential surface. The elements 27 and 27' are the same as those that have already been described. In addition there are used two other sets of strip structures mounted in the planes of the strips 27 and 27', these sets of strips are numbered 59 and 61 respectively. This system may be operated with increasing potentials on the sets of electrodes as they progress toward the target area. The fields set up between adjacent sets of electrodes have first a converging and then a diverging effect, but since the electrons are travelling faster when passing through the diverging fields and since the electrons are nearer the axis when in the diverging fields, the forces applied by these fields are operative through a shorter time and are weaker than those of the converging fields. Therefore they have a smaller effect so that the net effect is a convergence, the lens being the electronic analog of a meniscus lens. This arrangement conserves deflection power. It avoids the aberrations formed by the diffusing effects of a gauze electrode and the loss of beam current caused by the interception of electrons by the wires of an electrode of the latter type. Therefore, for some applications, it may have definite advantages. A net convergence can also be obtained with this structure by operating the intermediate electrodes 61 at a potential positive to both of the others.

Fig. 10 illustrates another form of lens wherein strips are used in place of gauze for the second electrode, but in a different manner. In this case the second or "electron-permeable" electrode is placed between the apertured electrode and the target, and comprises narrow strips 63 and 63' which are not mutually insulated. These strips are all narrower than the strips 27 or 27'. Strips 63 are mounted in the same planes as 27 or 27', and equally spaced between each pair of strips 63 are two strips 63'. There is therefore a strip 63 or 63' in line with the junction between each two adjacent colored phosphors. The strips 63, 63' are at the highest potential in the system, and therefore this type of lens system also employs the principle of post-acceleration, the color deflection taking place between strips 27 and 27' as before. The potentials can be so adjusted that substantially all of the convergence takes place before the electrons enter the apertures of the second electrode. If desired, an additional and still higher potential may be put upon the coating 49 to secure a still finer focus and increased brilliancy.

In all of the lens structures that have been described thus far the lenses used have been of cylindrical type and the color change has been attained by applying a secondary deflection of the electrons within the lens structure itself. Tubes have been constructed and publicly demonstrated using a quite different system, the color displayed being determined primarily by the direction from which the electron beam approaches the target and no secondary deflection being employed in the neighborhood of the target. One such tube which was publicly demonstrated before the Federal Communications Commission during the summer of 1950 employed three separate electron guns directed from slightly different angles toward a common center in a plane close to the target. A foraminated or perforated diaphragm, slightly spaced from but parallel to the target was perforated with a large number of closely spaced circular holes. The target itself comprised sub-areas of substantially equal size and shape as the holes in the diaphragm, the sub-areas being closely crowded together in a triangular arrangement and so arranged that all of the sub-areas of one particular color were alined with the hole and path of the beam from one of the three guns. The beam might therefore enter any one hole from any of the three guns, and the particular sub-area excited depended upon which of the three guns was momentarily supplying the beam. In another, somewhat similar tube, only a single gun was used but the area excited depended upon a preliminary deflection of the beam in the vicinity of the gun which determined the direction from which it entered the holes in the diaphragm.

The particular tubes referred to were, as far as the applicant is aware, the first "direct-view color tubes" to be publicly demonstrated and gave a highly creditable performance, considering the difficulties involved in their construction. The principal criticism which was levelled against them at the time was that they possessed relatively low luminosity, owing to the relatively large proportion of the time when the beam was occulted by the portions of the diaphragm intermediate the holes. The second form of tube mentioned, wherein the electron beam was "spun," also required that the beam be blanked during the period of transition between successive colors in order to avoid color contamination.

The present invention is applicable to tubes operating on the same general principle as those last mentioned. Figs. 11, 12 and 13 are illustrative of such a structure, Fig. 11 showing the structure in elevation; i. e, looking toward the screen through the aperture, Fig. 12 being an isometric view of the assembly, while Fig. 13 is a diagrammatic sectional view of the same character as has been used to describe the various preceding forms of lenses. In this case the lenses approximate the "spherical" type, although, in fact, their apertures or pupils are hexagonal. The apertured electrode 65 in this case takes the form of a perforated screen of relatively thin material. The apertures occupy as much as possible of the area of this electrode, the material left between adjacent apertures being only wide enough to give the necessary strength to hold the structure together. A very similar screen might, in fact, be woven of wire, but because of its flatness and the uniformity of the field which can be produced the perforated metal type of electrode is preferred. Alined with each aperture in the screen is a hexagon of three rhomboidal sub-areas emissive in the three chosen primary colors, these areas being shown by the same convention previously used. In this case the green sub-areas are designated as 67g, the red as 67r and the blue as 67b. In each group of such sub-areas alined with one aperture the colors are arranged in the same order and occupy the same azimuthal position around the axis of each elementary lens.

In the lens shown in the three figures last mentioned the second or electron-permeable electrode again takes the form of a very thin film 69 deposited over the phosphors. The lines of force, uniformly distributed over this film, all terminate upon the metal divisions between the apertures and, when the film is positive to the apertured electrode, form a converging lens as has already been described. Furthermore, if the film be operated about three times as positive to the electrode 65 as the latter is to the cathode, the focal point will be nearly in line with the axis of the entering beam and all of the electrons entering any one aperture will be concentrated in an area approximately 10% that of the aperture, or less. The spot formed by the impact of the beam is, therefore, small in comparison with the size of the fluorescent area on which it must register. Where the three-gun type of structure is used, a very minor portion of the beam is intercepted by the electrode 65, in place of over two-thirds, which must be the case where the beam is "diaphragmed off."

Where a single beam is spun to accomplish color change, the portion of it entering each lens may be made to traverse a circular path which is large in comparison with the diameter of the focal point. The duty cycle may therefore be made equal to the ratio (120°—A) to 120°, where A is the arc on the circumference of the circle through which the beam is spun which is subtended by the diameter of the beam itself. Under these circumstances a duty cycle of the order of 75% may be achieved, in comparison to a 15% duty cycle, which was announced as that of the tube demonstrated. This gain is in addition to that achieved by the greatly decreased diaphragming effect, and can result in a gain in luminosity of fifteenfold for the tube as a whole.

The lens type shown diagrammatically in Fig. 14 achieves an identical result in a slightly different manner. This lens is electrically the equivalent of the first element of the doublet shown in Figs. 1 to 5. The elements 65' are hexagonal tubes, nested honeycomb fashion, and in elevation the structure would appear much the same as Fig. 11, except that the gauze layer 35 would be interposed.

The lens structure illustrated in Figs. 11 through 14, although each element approximates a "spherical" lens, is subject to abberations because the fields to the hexagonal grid elements do not have circular symmetry. Such aberrations, as in the case of optical lens, affect the resolution, increasing the size of the focal spot. The structure shown in isometric projection in Fig. 15 and in plan in Fig. 16 is free of this disadvantage in that each elementary lens has a circular aperture and the field to the edges of each aperture is uniform. A finer focus can therefore be obtained and the transition time as between the different color areas when the spot is "spun" may be made a shorter portion of the color cycle. It has the corresponding disadvantage, however, that the percentage of the surface area of the apertured electrode is smaller than in the case of hexagonal apertures and therefore the utilization of the electron beam is less efficient. Which type would be used is therefore a matter of engineering choice, depending upon the characteristics of the system in which the device is to be used.

In these last two figures the apertured electrode is indicated as being formed of an assembly of tubular elements, both because a very rigid grid results and to show another possible alternative and thus to emphasize that all of the electrode arrangements which have been shown in connection with the linear-focus type of lens are also applicable to lenses of the point-focus type, any of the diagrams of the various electrode arrangements illustrated being capable of being considered as an axial section through a cylindrical, hexagonal, or other shaped apertured structure. Therefore, while the electron-permeable electrode utilized in the particular lens system shown in Figs. 15 and 16 is again a conducting film deposited upon the target surface, it is to be understood that gauze electrodes or foil electrodes disposed as shown in Figs. 5 or 7 could be used or secondary apertured electrodes alined with the tubular structure shown in Figs. 15 and 16 could be employed. Furthermore, since in tubes of the type for which these latter structures are primarily adapted all of the secondary deflection for color correction purposes is imparted before the electron beam enters the multiple lens system, the depth of the apertures may be shortened in the spherical analogs of Figs. 7 and 8, for instance, until each electrode becomes a mere plate or open wire mesh with alined apertures.

Figs. 17, 18 and 19 show various applications of the present invention to direct-view color tubes of the general types disclosed in this applicant's concurrently filed application entitled "Cathode Ray Tube for Polychrome Television Apparatus," Serial No. 219,240 and now U. S. Letters Patent No. 2,614,231, granted October 14, 1952, and in an earlier filed patent application, Serial No. 157,943, entitled "Polychrome Cathode Ray Tube," filed April 25, 1950. These figures show lenses of the linear-focus type and the color selecting deflection is applied between the strips 27 and 27' in the same manner as in the lenses described earlier in this application. These tubes are characterized by the fact that only one of the variously colored phosphors is deposited on the surface of the target screen, for example, the green phosphor 71 in Figs. 17 and 18. The red and blue phosphors are in this case deposited on strip electrodes 73 and 73' respectively, the red phosphor being deposited on strips 73, which are alined with the strips 27, while the blue phosphor is deposited on the strips 73', alined with strips 27'. In this case strips 73 and 73' are all connected together and jointly form the second electrode of the electron lenses. This construction offers the advantage that the phosphors do not have to be deposited with the same accuracy as in the case where all of the sub-areas are deposited on the same surface. It has a corresponding disadvantage in that a larger deflection is necessary in order to effect a complete change of color.

The use of the present invention in tubes of this character, however, gives a considerable increase in luminosity in that the beam entering into each interspace between the deflecting plates need not be diaphragmed down in order to prevent accidental excitation by marginal rays grazing the strips 73 and 73', and that, further, the deflection can be accomplished at lower potentials before the beam has acquired its final velocity. Furthermore, owing to the sharpness of the beam, the possible duty cycle is increased due to the short transition time between phosphors of different colors.

In Fig. 18 the strips 73 and 73' are provided with feet 75 of transparent material which also carry phosphors of the same color as those carried by the strips on which the feet are mounted. A less acute deflection of the beam is therefore necessary in order to change the color and because of the focusing effects the more severe diaphragming of the beam which would otherwise be required by this construction is not, in this case, necessary.

Fig. 19 shows a lens system which embodies some of the features of those first described with certain of those shown in Figs. 17 and 18. In this case, as in the earlier figures, all the phosphors are deposited directly on the target area, but the second electrode comprises strips 77 alined with the strips 27, 27'. This forms a lens structure of something the same character as where the second electrode is a film deposited upon the phusphor surface. This particular type of lens has a primary converging and a secondary diverging effect, but as the field is concentrated a greater distance from the target a smaller ratio of final to initial velocity is required. Empirically, in one lens of this type the voltage ratio giving the best results was 1.4 to 1.

Figs. 20 and 21 show a type of lens structure having certain characteristics distinguishing it from any of those thus far discussed. The lens might be described as a composite doublet, the first element of which comprises a gauze or other substantially unipotential electrode 35, of similar character to that shown in Figs. 1 to 5, placed adjacent to strip electrodes 27'' which are not mutually insulated and therefore are at the same operating potential. Midway between the strips 27'' there are mounted narrower strips 79, insulated from the strips 27'' and with the edges facing the target in substantially the same plane as the wider strips. The strips 79 are operated over a range of potential swinging from equality with the strips 27'' to a potential negative thereto. Their upper edges being shielded from electrode 35, they have little or no effect on the focus, as shown in Fig. 20. When the strips 79 are operated at a negative potential, however, they repel the beam, split it into two parts, and divide what has been a single focal point into two as is shown in Fig. 21. With phosphors arranged as shown in Figs. 20 and 21 this accomplishes the desired color change.

The lens structure diagrammed in Fig. 22 is substantially the inverse of that shown in the two preceding figures. The focusing fields are set up between the equal-potential strips 27'' and a conducting coating 69' on the target. The narrow deflecting strips 81 are in this case mounted between the strips 27'' and with one edge flush with the edges of the latter on the cathode side thereof. The strips 81 have no effect on the focus when at the same potential as strips 27'', but when swung negative split the beam into two parts, as indicated in the diagram.

Many forms of lens arangements have been described in this specification in order to illustrate clearly the flexibility of design which the invention provides. Many more combinations are possible, particularly along the line of adding additional electrode elements to sharpen the focus or, more important, to add additional post-acceleration and thus increase the brightness of the field. Of the various types of elementary lenses which are possible those utilizing the post-acceleration principle are usually to be preferred.

Although electron lenses have many properties in common with optical lenses and can, in general, be treated in much the same manner, they possess the very different characteristic that the ray paths through them are not, in general, traversed at a constant velocity. The transverse velocities which cause the paths to converge are proportional to the square root of the number of lines of force crossed by the electrons. If the longitudinal velocities of the electrons are constant after having passed through the converging field, the paths of the electrons will be substantially straight lines, as is the case of the light rays in an optical system. If the electrons are accelerated longitudinally after passing through the converging fields, the ray paths will be parabolic, the direction of curvature depending upon whether the acceleration is positive or negative. Where the post-accelerating field is applied after the converging velocities have been imparted to the electrons, these fields will, themselves, have a refractive effect, bending all of the paths toward the normal to the electrode to which the final accelerating potential is applied, so that in the extreme case the electron paths approach this normal as a limit. Such a post-accelerating effect tends to lengthen the focal length of the elementary lenses or, if the latter is to be held fixed, require a higher converging potential to accomplish the same result. If all potentials employed in the system are maintained in the same ratio, a given structure will produce a focus in the same plane. If the lens is of the single type, wherein both post-acceleration or deceleration and focusing are produced by the same field, the voltage ratio alone determines the focus, irrespective of the parts, but in multi-element lenses wherein the electrons drift through a unipotential space after the converging velocities have been imparted to them, the length of the paths through this space is obviously important and in this case the focal length is a function of the dimensions of the parts as well as the potential ratios.

It is known that electrode structures in the vicinity of the target are not broadly new in cathode ray tube practice. Such structures have been used in the past to collect secondary electrons emitted from the target and establish the potential of non-conducting targets at an equilibrium value, as parts of a main electron lens contributing to the focus of the beam on the target, and to cause secondary deflections for color control purposes. What is believed to be new is the use of a multiple-lens structure in proximity to the target, reconverging the beam to smaller dimensions in this vicinity, post accelerating the beam to conserve deflecting power while maintaining or increasing brilliancy, permitting smaller sub-areas of color to be used, with consequent higher color-resolution, and avoiding waste of beam current caused by diaphragming the beam.

It has been mentioned that this invention is applicable to any of the types of color television systems which have seriously been considered for adoption in this country. Most of these systems involve a sequential display of additive color components, and this obviously requires that the electron scanning beam be modulated in accordance with the intensity of each component synchronously with its display. The proponents of the various systems have disclosed in detail mechanisms whereby signals to accomplish this can be generated, transmitted, and separated at the receiver to accomplish the required results, and the necessary equipment to do this will be recognized as being generally symbolized in Fig. 1.

Where a cathode ray beam is subpected to a secondary, electrostatic deflection to accomplish the color change, the capacity of the deflecting structure imposes a load on the deflection potential generators which is, for a given deflection requirement, proportional to the frequency of the secondary deflection. The power requirements for the deflection system therefore increase enormously in the progression from field through line and segment to dot sequences, and with the latter may become practically prohibitive.

With the system here described it has been shown that such requirements may be decreased to as little as one per cent or less of that formerly required, and hence make practical systems of transmission and display which otherwise would be of theoretical interest only.

What is claimed is:

1. In a cathode-ray tube including an electron gun for generating a beam of cathode rays and a target area across which said beam is adapted to be deflected, an electrode system comprising an apertured electrode structure of substantially equal area to said target area mounted within said tube adjacent to said target area and at a substantially uniform distance therefrom, said apertured electrode structure comprising a grid formed of elements of sheet material disposed in planes substantially parallel to the paths of electrons reaching them from the gun, a second electrode of corresponding area and permeable to electrons mounted within said tube adjacent and at a substantially uniform distance from said first-mentioned electrode structure, and adapted to form therewith a multiplicity of converging electron lenses when different potentials are applied thereto, and connections for applying such potentials to said apertured and second-mentioned electrodes.

2. In a cathode-ray tube, an electron gun for generating a beam of cathode rays, a target area having coated thereupon a plurality of parallelly positioned phosphor strips arranged in a cyclic order each to produce light observable in one of three colors additive to produce white light and in which the strips to produce light to be observable in one selected color of the three alternate with each of the strips to produce the light observable in the other two colors and across which strips said beam is adapted to be deflected, an electrode system which includes an apertured electrode structure of substantially equal area to said target area mounted within said tube adjacent to said target area and at a fixed distance therefrom, the said apertured electrode comprising a multiplicity of linear conductors arranged generally parallel to the phosphor strip lengths with each conductor being generally centered relative to the phosphor strips adapted to produce light observable in two different alternating colors which strips are spaced by the phosphor strips each adapted to produce light observable in the same and third color, insulating means between adjacent ones of said conductors and interconnections between alternate ones of said conductors, a second electrode of area substantially corresponding to the target area and permeable to electrons mounted within said tube adjacent to and at a fixed distance from said first-mentioned electrode structure and adapted to form therewith a multiplicity of converging electron lenses when different potentials are applied thereto, and connections for applying different potentials to adjacent ones of said linear conductors and an accelerating potential to the second electrode.

3. Apparatus in accordance with claim 2 wherein said apertured electrode structure comprises a grid formed of elements of sheet material disposed in planes substantially parallel to the paths of electrons reaching them from said gun, insulating means between adjacent elements of said grid, and connections for applying different potentials between said adjacent elements to cause additional deflection of electrons passing therebetween and thus shifting the focal point of the electron lens of which said adjacent elements form a part.

4. Apparatus in accordance with claim 2 wherein said target comprises an area of light-permeable material and a phosphor coating on the side of said material facing said electron gun, said target area being divided into sub-areas which when excited by electrons from said gun are visible in different colors and a plurality of such sub-areas of different color being substantially alined with each aperture of said apertured electrode and the direction of the electrons arriving at said apertures from said gun.

5. Apparatus in accordance with claim 2 wherein said target area comprises a multiplicity of sub-areas of phosphors emissive of light of different colors, a plurality of such sub-areas having different color emissivity being disposed within the area in alinement with the aperture of each of said electron lenses and the beam of cathode rays from said electron gun.

6. Apparatus in accordance with claim 1 wherein the target comprises an area of light permeable material and a phosphor coating on the side of said material facing the electron gun, the target area being divided into sub-areas which when excited by electrons from the electron gun are visible in different individual colors and a plurality of such sub-areas of different visible colors are substantially alined with each aperture of the apertured electrode and in the direction of the electrons arriving at the apertures from said gun and wherein each aperture of said apertured electrode is defined by a plurality of mutually insulated elements, interconnections between those of said elements occupying like positions with respect to alternate apertures, and connections for applying different potentials to the elements defining any one aperture.

7. Apparatus in accordance with claim 6 wherein said target area comprises a plurality of substantially contiguous vitreous rods of substantially rectangular cross-section, said rods being so positioned and mounted that a junction between adjacent rods lies substantially in the plane of each of said grid elements, a plurality of longitudinal strips of phosphors emissive of light of different colors deposited on the side of said rods facing said grid between each of said junctions, a layer of light-reflecting material covering said phosphors and a layer of light-reflecting material in each of said junctions, the side of each of said rods opposite to that whereon said phosphors are deposited being of light-diffusing character.

8. Apparatus in accordance with claim 7 wherein the strips of phosphors on each side of each of said junctions are emissive of light of the same colors in the same order, counting outward from the junction.

9. In a cathode-ray tube wherein means are provided to develop a modulatable and substantially focused electron beam to be directed to impact a target area of the tube in a substantially focused manner to produce light thereat and with which tube there is associated electron-beam deflecting means to cause the so-developed beam to trace a raster upon the target, the beam focusing combination comprising a first electrode structure including a plurality of closely spaced interleaved conducting sheets spaced for electron passage therethrough, said sheets occupying a transverse area in the tube substantially corresponding to that of the traced target, a substantially planar conducting electron-permeable electrode structure also of an area substantially like that of the target and substantially uniformly spaced throughout its area from the apertured electrode, each of said electrodes having terminals adapted for connection to sources of external voltage, each of said electrodes being located in the path of the electron beam between its source and the target and substantially closer to the target than to the source, said electrodes being adapted when supplied with operating voltages to form a multiplicity of final electron beam converging electrostatic focusing lens elements of a number equal to the number of apertures in the apertured electrode to converge the previously focused electron beam upon the target.

10. A cathode-ray tube comprising a target area composed of a plurality of substantially rectangular cross-section vitreous rods, a phosphor coating on one side of each of said rods, said phosphor coating comprising a substance adapted to luminesce under electron beam impact and means to cause light of different colors to be initiated at selected sections of the said coated rod, a conducting electron-permeable metallic film coating the said light-producing phosphor, an apertured electrode comprising a plurality of interleaved conducting strips spaced from one another by spacings of the order of definition in one direction to be produced by the light emanating from the target, means to develop a focused electron beam adapted to be directed toward the target through the apertured and electron-permeable electrodes and connections for applying voltages from an external source to the said conducting film and apertured electrode to form the apertured electrode and the electron-permeable electrode into a multiplicity of converging electrostatic lens elements of a number corresponding to the number of apertures in the apertured electrode for refocusing the focused electron beam upon the target subsequent to its entrance into each aperture of the apertured electrode.

11. A cathode-ray tube comprising a target area composed of a plurality of substantially rectangular cross-section vitreous rods, a phosphor coating on one side of each of said rods, said phosphor coating comprising a substance adapted to luminesce under electron beam impact and means to cause light of different colors to be initiated at selected sections of the said coated rod, a conducting electron-permeable metallic film coating the said light-producing phosphor, an apertured electrode comprising a plurality of interleaved conducting strips spaced from one another by spacings of the order of definition in one direction to be produced by the light emanating from the target, means to develop a focused electron beam adapted to be directed toward the target through the apertured and electron-permeable electrodes and connections for applying voltages from an external source to the said conducting film and apertured electrode for accelerating the said beam to a relatively high velocity in the region immediately adjacent the target for impacting the target at the accelerated velocity and concurrently to form the apertured electrode and the electron-permeable electrode into a multiplicity of converging electrostatic lens elements of a number corresponding to the number of apertures in the apertured electrode for refocusing the focused electron beam upon the target subsequent to its entrance into each aperture of the apertured electrode.

12. In a cathode-ray tube wherein there is included an electron beam source and a target spaced therefrom to be impacted by the said electron beam, and means to deflect the beam to trace the target area, the combination comprising a light-producing phosphor coating upon the target adapted to luminesce under electron beam impact and to produce light to be observed in different colors of a repeating color cycle with the change between individual observable colors traced in at least one direction occurring in a space less than the length of one selected dimension of a point on the traced target, an apertured electrode element supported generally adjacent the target, the apertures in the electrode substantially corresponding in at least one direction to the number of image points to be traced in the said direction, said apertured electrode comprising a plurality of planar conducting strips substantially parallelly positioned one with respect to the other and spaced from one another approximately by distances substantially proportional to one dimension of each image area to be traced upon the target by the deflected electron beam, a second electron-permeable electrode located in proximity to the said apertured electrode and through which the electrons move between the source and the target and connections to apply voltage to the said electrodes to accelerate the beam in the region of the target and to form the electron-permeable electrode and the apertured electrode into a plurality of converging lens elements of a number corresponding to the number of apertures in the apertured electrode to refocus the beam passing through the apertures to the target.

13. The electrode structure claimed in claim 12 wherein the electron-permeable electrode comprises a metallic coating contacting the light-developing phosphor of the target and wherein the apertured electrode is positioned in proximity thereto and between the said electron-permeable electrode and the electron beam source.

14. The electrode structure claimed in claim 13 wherein the apertured electrode comprises a plurality of interleaved conducting sheets between which the electron beam passes between the source and the target, said interleaved sheets being located in proximity to the target, and a mesh electrode having a substantially unipotential surface between the interleaved electrodes and the electron beam source and connections for applying voltages to said electrodes.

15. Cathode-ray tube apparatus comprising a phosphor-coated target element adapted to initiate light from separate sub-elemental area sections in individual colors so that areas of elemental size may produce light observable in a plurality of colors, an electron-permeable conductor surface overlaying the said phosphor, an apertured electrode positioned generally adjacent the electron-permeable electrode and so located that the said electron-permeable electrode is intermediate the apertured electrode and the phosphor, said apertured electrode having apertures of a number substantially corresponding to the number of elemental areas adapted to produce light from the said target by electron beam impact, means to release electrons adapted to be confined in desired beam formation and directed for scanning the target through the said apertured electrode from a plurality of angular positions relative to the plane of said apertured electrode and thence through said electron-permeable electrode with the angle of passage of said beam through the apertured electrode defining the impacted sub-elemental area of phosphor coating upon the target, and connections for applying voltages from external sources to the electron-permeable electrode and the apertured electrode to form the apertured electrode and the electron-permeable electrode into a multiplicity of converging electrostatic lenses for converging the electron beam passing through the apertures to minute areas of the target determined as to location by the angle of entrance of the scanning beam into the apertured electrode so that different colors of light for observation are developed from different sub-elemental areas of the tube.

16. Cathode-ray tube apparatus comprising a cathode ray tube having therein means to develop an electron beam and a target to receive the electron beam, said target having a phosphor coating adapted to produce luminous effects in a plurality of additive component colors of a polychrome pictorial representation with image point creation in each component color being developed over areas of sub-elemental size, means to deflect the developed electron beam to trace the target and to form thereon a raster, a first focusing means to focus the developed electron beam to a point of substantially elemental area size at the target, a secondary beam focusing electrode system comprising an apertured electrode of an area substantially corresponding to that of the target and having apertures of a number substantially corresponding to the total number of elemental areas forming at least one linear trace in the complete raster, said apertured electrode being located substantially parallel to the target and in the path of the scanning beam from the source to the target so as to be traced by the scanning beam coincidentally to the formation of the raster upon the target, said apertured electrode comprising a plurality of sets of planar conducting sheet electrodes interleaved with respect to each other and spaced from one another by spacings of the order of one dimension of an elemental area of the created raster and an electron-permeable electrode element also of substantially target area and positioned substantially parallel to the apertured electrode and in proximity thereto, so that the said scanning beam passes therethrough to reach the target, means to supply control voltages to the apertured and electron-permeable electrodes to accelerate the scanning beam in the region substantially adjacent the target and to form adjacent the target by the potential relationship between the apertured electrode and the electron-permeable electrode a plurality of electrostatic scanning beam converging lenses of a number corresponding to the number of apertures in the apertured electrode so that the substantially focused electron beam is refocused upon passing through each aperture of the apertured electrode to define an area of sub-elemental size upon reaching the target.

17. The apparatus claimed in claim 16 comprising, in addition, means to supply control potentials upon the interleaved electrodes of the interleaved sheets of the apertured electrode to vary the potential of said sheets of one interleaved set relative to the other interleaved set, means to maintain the potential on the electron-permeable electrode at a relatively constant potential, and means for switching the polarity of voltage applied to the interleaved electrodes of the apertured electrode relative to one another positionally to shift within an area of substantially elemental size the point of ultimate refocus of the beam passing through the apertured electrode toward the target so that with changes in potential of one interleaved electrode sheet relative to the other the scanning beam refocuses to different sub-elemental areas of the target.

18. The apparatus claimed in claim 17 comprising, in addition, means to modulate the developed electron beam and means to synchronize the modulation with the positional shift of the beam at the target to coordinate modulation and color response.

19. In cathode-ray tube apparatus wherein there is a cathode-ray tube having means to develop an electron beam and a target to receive the electron beam and wherein the target has a phosphor coating adapted to produce, as a result of electron beam impact, luminous effects in a plurality of additive component colors of a tricolor pictorial representation with image point creation in each color being developed over areas of sub-elemental size and wherein the developed electron beam is bidimensionally deflected to trace the target to develop a raster, the method of improving definition and establishing color image representations directly which comprises the steps of initially focusing the electron beam as it is developed to define points of substantially elemental area size on the target by beam impact, separately developing separate converging electrostatic fields of a number substantially corresponding to the total number of elemental areas forming at least one linear trace of the complete raster, directing the initially focused electron beam through the separate converging fields substantially individually and refocusing the electron beam as it passes through each separate converging field and causing the target impacting beam to define an area of less than elemental size as it impacts the target, cyclically altering the point of refocus of the beam at the target to change the resultant observable luminescent effect from one to another of the colors of a tricolor image representation in an order of A, B, A, C, A, B, etc. where A, B and C represent the three colors of light adapted in additive combination to produce white light and then concurrently with the beam refocusing applying a beam accelerating field in the region of the target to increase the beam impact velocity on the target and thereby the resultant image brightness.

20. The method claimed in claim 19 comprising, in addition, modulating the beam synchronously with the cyclic alteration of beam focus point change.

21. The method of operating cathode-ray tube apparatus wherein there is developed an electron beam for impacting a target area having a phosphor coating adapted to produce luminous effects under electron beam impact, which luminous effects become observable from areas of sub-elemental size in individual component colors of an additive tricolor combination, which comprises deflecting the electron beam to cause it bidimensionally to trace the target, preliminarily focusing the so-deflected electron beam to bring it to the target at substantially elemental area cross-sections, developing a plurality of converging electrostatic fields effective within the immediate area of the target, directing the preliminarily focused electron beam through the individually-developed converging fields in sequence prior to its impacting the target so as to refocus the beam for substantially each individual area of the target impact, cyclically altering the point of refocus of the beam at the target to change the resultant observable luminescent effect from one to another of the colors of a tricolor image representation in an order of A, B, A, C, A, B, etc. where A, B and C represent the three colors of light adapted in additive combination to produce white light, and modulating the beam synchronously with the change in impact position resulting from refocus.

22. In a cathode-ray tube including an electron gun for generating a beam of cathode rays and a target area across which said beam is adapted to be deflected, a lens electrode system comprising an electrode provided with a multiplicity of apertures having two dimensional symmetry and extending over an area substantially equal to that of the target area and supported within the tube adjacent to the target and at a substantially uniform distance therefrom and a second electrode of substantially corresponding area and permeable to electrons also supported within the tube adjacent to and at a substantially uniform distance from the first mentioned electrode structure and substantially in the plane of the target and adapted to form with the apertured electrode a multiplicity of converging electron lenses when different potentials are applied thereto and when the electron permeable electrode is the more positive, and connections for applying potentials to the apertured and electron permeable electrodes such that a cathode-ray beam directed from the electron gun toward the target and through the apertured electrode is converging in two dimensions in its passage to the target.

23. In a cathode-ray tube including an electron gun for generating a beam of cathode rays and a target area across which said beam is adapted to be deflected, a lens electrode system comprising an electrode provided with a multiplicity of apertures having two dimensional symmetry and extending over an area substantially equal to that of the target area and supported within the tube adjacent to the target and at a substantially uniform distance therefrom and a second electrode of substantially corresponding area and permeable to electrons also supported within the tube adjacent to and at a substantially uniform distance from the first mentioned electrode structure and substantially in the plane of the target and adapted to form with the apertured electrode a multiplicity of converging electron lenses when different potentials are applied thereto and when the electron permeable electrode is the more positive, the said target area having coated thereupon phosphors emissive of light in each of three component colors of additive color characteristics when subjected to the impact of the produced beam of cathode rays, each of the phosphors being confined to a sub-area of the target and each sub-area approximating the aperture area divided by the number of separate component colors to be portrayed, with all sub-areas being arranged in the same order with one group of each phosphor-type being alined with each aperture and the phosphors producing like colors having the same azimuthal position around the axis of each elementary lens and connections for applying potentials to the apertured and electron permeable electrodes such that a cathode-ray beam directed from the electron gun toward the target and through the apertured electrode is converging in two dimensions in its passage to the target.

24. In a cathode-ray tube including an electron gun for generating a beam of cathode rays and a target area across which said beam is adapted to be deflected, a lens electrode system comprising an electrode provided with a multiplicity of substantially circular apertures extending over an area substantially equal to that of the target area and supported within the tube adjacent to the target and at a substantially uniform distance therefrom and a second electrode of substantially corresponding area and permeable to electrons also supported within the tube adjacent to and at a fixed distance from the first mentioned electrode structure and substantially in the plane of the target and adapted to form with the apertured electrode a multiplicity of converging electron lenses when different potentials are applied thereto and when the electron permeable electrode is the more positive, and connections for applying potentials to the apertured and electron permeable electrodes such that a cathode-ray beam directed from the electron gun toward the target and through the apertured electrode is converging in a circular pattern in its passage to the target.

25. In a cathode-ray tube including an electron gun for generating a beam of cathode rays and a target area across which said beam is adapted to be deflected, a lens electrode system comprising an electrode providing a multiplicity of substantially hexagonal apertures extending over an area substantially equal to that of the target area and supported within the tube adjacent to the target and at a substantially uniform distance therefrom and a second electrode of substantially corresponding area and permeable to electrons also supported within the tube adjacent to and at a substantially uniform distance from the first mentioned electrode structure and substantially in the plane of the target and adapted to form with the apertured electrode a multiplicity of converging electron lenses when different potentials are applied thereto and when the electron permeable electrode is the more positive, and connections for applying potentials to the apertured and electron permeable electrodes such that a cathode-ray beam directed from the electron gun toward the target and through the apertured electrode is converging in two dimensions in its passage to the target.

26. In a cathode-ray tube including an electron gun for generating a beam of cathode rays to produce tricolor images observable upon a target area across which the developed beam is adapted to be deflected, an electrode providing a multiplicity of substantially hexagonal apertures extending over an area substantially equal to that of the target area and supported within the tube adjacent to the target and at a substantially uniform distance therefrom, a coating of three different characteristic phosphors upon the target area, said phosphors being emissive individually of light in one of each of the three component colors of a tricolor additive characteristic when subjected to the impact of the produced cathode-ray beam, the phosphors being confined to sub-areas of the target individually of shape similar to the apertures and each sub-area, including three approximately rhomboidal-shaped areas each emissive of light observable in a different color of the tricolor when activated by the cathode-ray beam and each rhomboidal-shaped area being approximately one-third that of the aperture area and the sub-areas also being arranged in the same order with one group of each phosphor-type being substantially alined with each aperture and the phosphors producing like colors of light having the same azimuthal position relative to the aperture through which the cathode-ray beam is directed toward it, an electron permeable conducting metallic coating on the surface of the phosphor coating toward the apertured electrode, said coating comprising a second electrode of an electron lens system collectively forming a multiplicity of electron lenses converging a cathode-ray beam directed toward the target area through the apertured electrode in its passage to the target when a potential difference is applied to the conducting film and the apertured electrode and the conducting film is the more positive, and connections for applying potentials to the apertured and electron permeable electrodes.

27. In a cathode-ray tube including an electron gun for generating a beam of cathode rays and a target area across which said beam is adapted to be deflected, an electrode system comprising an electrode structure extending over an area subtially equal to the target area and formed of a plurality of generally uniformly spaced linear conductors located at fixed distance from the target, a second electrode of substantially corresponding area and permeable to electrons supported within the tube adjacent to and at a fixed distance from the first mentioned electrode structure and adapted to form therewith a multiplicity of converging electron lenses when different potentials are applied thereto, the target area having coated thereupon cyclically repeating sets of substantially contiguously positioned phosphor strips of three different light producing characteristics extending substantially parallel to the linear conductors, said phosphor strips being adapted to become luminescent under the impact of the cathode-ray beam and collectively to provide an additive character of color image, said target coating strips being so arranged that a strip of identical characteristic is substantially centered relative to each pair of the linear conductors so as to be impacted by a cathode-ray beam passing therethrough when the conductors are at like potential, the strips adapted to become luminescent in the other two colors being disposed at either side of the said centered strips and centered behind each linear conductor with respect to the path of the cathode-ray beam reaching said conductors from the electron gun so that with the establishment of potential differences between adjacent linear conductors the cathode-ray beam is adapted to be deflected in its passage to the target in a direction such that it impinges upon the phosphor strip behind the more positive linear conductor, and connections for applying potentials to the linear conductors and to the electron permeable electrode.

28. In a cathode-ray tube adapted for the production of additive tricolor images and including an electron gun for generating a beam of cathode rays and a target area across which said beam is adapted to be deflected to trace a raster, an electrode system comprising an electrode structure extending over an area substantially equal to the target area and formed of a plurality of sets of interleaved linear conductors each generally uniformly spaced from the other and located at substantially uniform distance from the target, a second electrode of substantially corresponding area and permeable to electrons supported within the tube adjacent to and at a substantially uniform distance from the first mentioned electrode structure and adapted to form therewith a multiplicity of converging electron lenses when different potentials are applied thereto, the target area having coated thereupon cyclically repeating sets of substantially contiguously positioned elongated phosphor strips of three different characteristics extending substantially parallel to the linear conductors, said phosphor strips being adapted to become luminescent under the impact of the cathode-ray beam and collectively to provide an additive character of color image, said target coating strips being so arranged that a strip of identical characteristic is substantially centered relative to each pair of the linear conductors so as to be impacted by a cathode-ray beam passing therethrough when the conductors of each set are at like potential, the said strips adapted to exhibit luminescent effects in the other two colors being disposed at either side of the said centered strips with strips exhibiting one of the other two colors being centered behind the linear conductors of one of the sets and the strips exhibiting the second of the other two colors being centered behind the linear conductors of the second set, each considered with respect to the path of the cathode-ray beam reaching said conductors from the electron gun so that with the establishment of potential differences between adjacent linear conductors the cathode-ray beam is adapted to be deflected in its passage to the target in a direction such that it impinges upon the phosphor strip behind the more positive linear conductor, and connections for applying a potential to the electron permeable electrode which is more positive than that applied to the linear conductors so that any beam of cathode rays emanating from the electron gun which is directed toward the linear conductors is converged in the region between the linear conductors and the target and impacts the target at a velocity higher than that which it had upon reaching the linear conductors.

29. A cathode-ray tube comprising a target area formed of substantially contiguous elongated phosphor strips of three different light emissive characteristics under electron beam impact and arranged in a cyclically repeating sequence, a conducting electron permeable metallic film coating the said light-producing phosphors, an apertured electrode comprising a plurality of interleaved linear conductors spaced from one another by spacings of the order of definition intended to be produced in one direction by the light emanating from the target, the phosphor strips extending substantially parallel to the linear conductors and arranged with a strip of one of the three light emissive characteristics substantially centered relative to each pair of adjacent linear conductors and the strips of the other two light emissive characteristics arranged alternately at each side thereof, means to develop a focused electron beam adapted to be directed toward the target through the apertured and electron permeable electrodes, and connections for applying voltages from an external source to the conducting film and to the apertured electrode to form the apertured electrode and the electron permeable electrode into a multiplicity of converging electron lens elements of a number corresponding to the number of apertures in the apertured electrode so that with application to the electron permeable electrode of a voltage which is positive relative to that applied to the apertured electrode the developed electron beam is converged in the direction of the target and accelerated toward the target in passing between the apertured electrode and the target, the said electron beam being adapted to develop light of one selected color upon the target area when the linear conductors are of like potential and to develop light in a first of the two other colors when alternate linear conductors are positive and negative with respect to each other in one order and in the second of the two other colors when the said linear conductors are positive and negative with respect to each other in the opposite order, all of said linear conductors being maintained negative relative to the electron permeable metallic coating.

30. A cathode-ray tube comprising a target area formed of substantially contiguous phosphor strips of three different light emissive characteristics under electron beam impact, said strips each being of sub-elemental width in one dimension and arranged in a cyclically repeating sequence, a conducting electron permeable metallic film coating the said light-producing phosphors, a grid electrode comprising a plurality of sets of electrically connected interleaved linear conductors spaced from one another by spacings of the order of definition intended to be produced in one direction by the light emanating from the target, the phosphor strips extending substantially parallel to the linear conductors and arranged with a strip of one of the three light emissive characteristics being substantially centered relative to adjacent linear conductors of each set and the strips of the other two light emissive characteristics arranged alternately at each side thereof, means to develop a focused electron beam adapted to be directed toward the target through the apertured and electron permeable electrodes, and connections for applying voltages from an external source to the conducting film and to the grid electrode to form the said grid electrode and the electron permeable electrode into a multiplicity of converging electron lens elements of a number corresponding to the number of apertures formed between the sets of linear conductors of the grid electrode so that with application to the electron permeable electrode of a voltage which is positive relative to that applied to the grid electrode the developed electron beam is converged in the direction of the target and accelerated toward the target in passing between the grid electrode and the target and the said electron beam being adapted to develop light of one selected color upon the target area when the linear conductors are of like potential and to develop light in a first of the two other colors when alternate linear conductors are positive and negative with respect to each other in one order and in the second of the two other colors when the said linear conductors are positive and negative with respect to each other in the opposite order, all of said linear conductors being maintained negative relative to the electron permeable metallic coating.

31. In a cathode-ray tube wherein an electron gun is utilized for generating a beam of cathode rays adapted to be caused to scan a target area to trace a raster thereon, an electron lens and color control combination comprising a first electrode structure extending over an area substantially equal to the target area and formed of a plurality of generally uniformly spaced linear conductors located at a fixed distance from the target and in the path along which the developed cathode rays pass from the electron gun to the target, a second electrode structure permeable to the electron flow constituting the cathode-ray beam which is adapted to pass therethrough, said electron permeable electrode being supported within the tube adjacent to and at a substantially fixed distance from the first mentioned electrode structure and adapted to form therewith a multiplicity of converging electron lenses in the region wherein the electron flow is accelerated when different potentials are applied thereto and the electron permeable electrode is the more positive, the said target area having coated thereupon cyclically repeating sets of substantially contiguously positioned phosphor strips adapted to become luminescent under the impact of the cathode-ray beam in three different light-producing characteristics and extending in directions substantially parallel to the linear conductors, said phosphor strips, when excited, collectively providing an additive color image on the target, the said phosphor strips being so arranged that a strip of like light-producing color characteristic is so located relative to each pair of the linear conductors that a cathode-ray beam directed from the electron gun to pass through the apertures formed between adjacent conductors impacts a like characteristic phosphor strip for all angles of cathode-ray beam deflection due to scanning when the conductors of the first electrode structure are maintained at like potential relative to the electron permeable electrode, the phosphor strips adapted to become luminescent in the other two colors being arranged at either side of the said like characteristic phosphor strips and between the said strips so as to form a repeating cycle of phosphors to develop light in colors occuring in a sequence A, B, A, C, A, B and so on, where A, B and C represent the three colors of light adapted to be developed by cathode-ray beam impact, the establishment of potential differences between adjacent linear conductors causing micro-deflection of the cathode-ray beam toward the more positive linear conductor in the region between the linear conductors and the electron permeable electrode, and connections for applying potentials to the linear conductors of the first electrode structure and to the electron permeable electrode and for maintaining the electron permeable electrode at a potential which is positive relative to both the electron gun and the linear conductors so that the cathode-ray beam is accelerated in the region between the linear conductors of the first electrode structure and the electron permeable electrode to be refocused upon the target in passing between the said linear conductors and the electron permeable electrode to impinge upon the target.

32. In a cathode-ray tube wherein an electron gun is utilized for generating a beam of cathode rays adapted to be caused to scan a target area to trace a raster thereon, an electron lens and color control combination comprising a first electrode structure extending over an area substantially equal to the target area and formed of a plurality of generally uniformly spaced linear conductors located at a fixed distance from the target and in the path along which the developed cathode rays pass from the electron gun to the target, a second electrode structure permeable to the electron flow constituting the cathode-ray beam which is adapted to pass therethrough, said electron permeable electrode being supported within the tube adjacent to and at a substantially fixed distance from the first mentioned electrode structure and adapted to form therewith a multiplicity of converging electron lenses in the region wherein the electron flow is accelerated when different potentials are applied thereto and the electron permeable electrode is the more positive, the said target area having coated thereupon cyclically repeating sets of substantially contiguously positioned phosphor strips and in contact with said electron permeable electrode and adapted to become luminescent under the impact of the cathode-ray beam in three different light-producing characteristics and extending in directions substantially parallel to the linear conductors, said phosphor strips, when excited, collectively providing an additive color image on the target, the said phosphor strips being so arranged that a strip of like light-producing color characteristic is so located relative to each pair of the linear conductors that a cathode-ray beam directed from the electron gun to pass through the apertures formed between adjacent conductors impacts a like characteristic phosphor strip for all angles of cathode-ray beam deflection due to scanning when the conductors of the first electrode structure are maintained at like potential relative to the electron permeable electrode, the phosphor strips adapted to become luminescent in the other two colors being arranged at either side of the said like characteristic phosphor strips and between the said strips so as to form a repeating cycle of phosphors to develop light in colors occurring in a sequence A, B, A, C, A, B and so on, where A, B and C represent the three colors of light adapted to be developed by cathode-ray beam impact, the establishment of potential differences between adjacent linear conductors causing micro-deflection of the cathode-ray beam toward the more positive linear conductor in the region between the linear conductors and the electron permeable electrode, and connections for applying potentials to the linear conductors of the first electrode structure and to the electron permeable electrode and for maintaining the electron permeable electrode at a potential which is positive relative to both the electron gun and the linear conductors so that the cathode-ray beam is accelerated in the region between the linear conductors of the first electrode structure and the electron permeable electrode to be refocused upon the target in passing between the said linear conductors and the electron permeable electrode to impinge upon the target.

33. A cathode-ray tube comprising an electron gun for generating a beam of cathode rays, a target having a multiplicity of parallelly positioned phosphor strips adapted to become luminescent on electron impact in three colors additive to produce white light and across which said beam is adapted to be deflected, a multiplicity of linear conductors forming an apertured electrode of area substantially equal to the area of said target, said conductors being mounted within said tube adjacent to said target, means to insulate adjacent ones of said conductors and means to interconnect alternate ones of said conductors, an electron permeable electrode having an area substantially equal to that of said target mounted within said tube adjacent to said apertured electrode and adapted to form therewith a multiplicity of converging electron lenses when different potentials are applied to said apertured and electron permeable electrodes, connections for applying different potentials to adjacent ones of said linear conductors and an accelerating potential to said electron-permeable electrode, said phosphor strips being laid down on said target substantially parallel to said conductors in a cyclic order with strips luminescent in the first of said three colors spaced from each other alternately by a strip luminescent in a second of said three colors and by a strip luminescent in the third of said three colors.

34. A cathode-ray tube comprising an electron gun for generating a beam of cathode rays, a target having a phosphor coating adapted to become luminescent on electron impact to develop light observable in three colors additive in elemental areas of beam impact to produce white light and across which coating the beam of cathode rays is adapted to be deflected to trace a raster, a multiplicity of linear conductors forming an apertured electrode of area substantially equal to that of the phosphor-coated target, said linear conductors being supported within the tube adjacent to the phosphor-coated target, means to insulate adjacent ones of said linear conductors and means to interconnect alternate ones of said linear conductors to form interleaved electrode sets, an electron-permeable electrode also having an area substantially equal to that of the phosphor-coated target supported within said tube adjacent to the apertured electrode and in the path of the beam of cathode rays from the electron gun to the apertured electrode, the electron-permeable electrode being adapted to form with the apertured electrode a multiplicity of converging electron lenses when different potentials are applied to the apertured and electron-permeable electrodes relative to the electron beam source and the electron-permeable electrode is the more positive, connections for applying different potentials to adjacent ones of said linear conductors and an accelerating potential to said electron-permeable electrode, the phosphor coatings of different light-producing characteristics being applied to the target in a cyclic order such that areas of the target becoming luminescent to produce different colors of light are so located that the color of light instantaneously observable is dependent upon the path taken by the cathode-ray beam in the tube region between the apertured electrode and the target, and an electron-permeable conductive coating upon the impacted surface of the phosphor-coated target and adapted to be maintained at a positive potential relative to the electron beam source at least as high as that of the electron-permeable electrode positioned between the apertured electrode and the electron gun.

35. A cathode-ray tube comprising an electron gun for generating a beam of cathode rays, a target having a multiplicity of parallelly positioned phosphor strips adapted to become luminescent on electron impact in three colors additive to produce white light and across which strips said beam is adapted to be deflected, a multiplicity of linear conductors forming an apertured electrode of area substantially equal to the target area supported within said tube adjacent to said target, means to insulate adjacent ones of said linear conductors and means to interconnect alternate ones of said linear conductors, an electron-permeable electrode having an area substantially equal to that of the target area mounted within the tube and adjacent to the apertured electrode and adapted to form therewith a multiplicity of converging electron lenses when different potentials are applied to the apertured electrode and the electron-permeable electrode, means to support said electron-permeable electrode in the path of the beam of cathode rays from the electron gun to the apertured electrode, an electron-permeable conducting layer coating the surface of the phosphor strips adapted to be impacted by the beam of cathode rays, said coating layer being adapted to be maintained at positive potential relative to the apertured electrode at least as high as that applied to the electron-permeable electrode, connections for applying different potentials to adjacent ones of said linear conductors and an accelerating potential to said electron-permeable electrode, said phosphor strips being laid down on said target substantially parallel to said conductors in a cyclic order with strips luminescent in the first of said three colors spaced from each other alternately by a strip luminescent in a second of said three colors and by a strip luminescent in the third of said colors.

36. A cathode-ray tube comprising an electron gun for generating a beam of cathode rays, a target having a multiplicity of parallelly positioned phosphor strips adapted to become luminescent on electron impact in three colors additive to produce white light and across which strips said beam is adapted to be deflected, a multiplicity of linear conductors forming an apertured electrode of area substantially equal to the target area supported within the tube adjacent to said target, means to insulate adjacent ones of said conductors and means to interconnect alternate ones of said conductors, a pair of electron-permeable electrodes each also having an area substantially equal to that of the target area mounted within the tube and adjacent to the apertured electrode and adapted to form therewith a multiplicity of converging electron lenses when different potentials are applied to the apertured electrode and the electron-permeable electrodes, means to support one of said electron-permeable electrodes in the path of the beam of cathode rays from the electron gun to the apertured electrode and the other of said electron-permeable electrodes in the path of the beam of cathode rays from the apertured electrode to the target, an electron-permeable conducting layer coating the surface of the phosphor strips adapted to be impacted by the beam of cathode rays, said coating layer being adapted to be maintained at positive potential relative to the apertured electrode at least as high as the first-named electron-permeable electrodes, connections for applying different potentials to adjacent ones of said linear conductors and an accelerating potential to said electron-permeable electrode, said phosphor strips being laid down on said target substantially parallel to said linear conductors in a cyclic order with strips luminescent in the first of said three colors spaced from each other alternately by a strip luminescent in a second of said three colors and by a strip luminescent in the third of said three colors.

37. The cathode-ray tube claimed in claim 36 comprising, in addition, terminal means adapted for applying a potential to the electron-permeable target coating which is positive relative to that of the electron-permeable electrodes of the electron lenses to accelerate the beam of cathode rays in the region between the electron lenses and the phosphor-coated target.

References Cited in the file of this patent

UNITED STATES PATENTS

| Number | Name | Date |
| --- | --- | --- |
| 2,518,200 | Sziklai et al. | Aug. 8, 1950 |
| 2,529,485 | Chew | Nov. 14, 1950 |
| 2,532,511 | Okolicsanyi | Dec. 5, 1950 |
| 2,544,690 | Koch et al. | Mar. 13, 1951 |
| 2,568,448 | Hansen | Sept. 18, 1951 |
| 2,571,991 | Snyder, Jr. | Oct. 16, 1951 |
| 2,579,665 | Green | Dec. 25, 1951 |
| 2,579,705 | Schroeder | Dec. 25, 1951 |
| 2,581,487 | Jenny | Jan. 8, 1952 |
| 2,595,548 | Schroeder | May 6, 1952 |
| 2,602,145 | Law | July 1, 1952 |
| 2,606,303 | Bramley | Aug. 5, 1952 |
| 2,612,614 | Amdursky et al. | Sept. 30, 1952 |
| 2,630,542 | Goldsmith | Mar. 3, 1953 |